United States Patent
Bechberger et al.

(10) Patent No.: US 6,555,085 B2
(45) Date of Patent: Apr. 29, 2003

(54) METHOD OF IMPROVING YIELD OF CHLORINE DIOXIDE GENERATION PROCESSES

(75) Inventors: Edward J. Bechberger, Mississauga (CA); Mario Luis Costa, Hamilton (CA); Marek Lipsztajn, Etobicoke (CA)

(73) Assignee: Superior Plus Inc., Toronto (CA)

( * ) Notice: Subject to any disclaimer, the term of this patent is extended or adjusted under 35 U.S.C. 154(b) by 66 days.

(21) Appl. No.: 09/774,033

(22) Filed: Jan. 31, 2001

(65) Prior Publication Data

US 2002/0037248 A1 Mar. 28, 2002

Related U.S. Application Data

(60) Provisional application No. 60/179,412, filed on Feb. 1, 2000.

(51) Int. Cl.[7] ............................. C01B 11/02
(52) U.S. Cl. ............... 423/477; 423/478; 252/187.21
(58) Field of Search ............... 423/477, 478, 423/479, 480; 252/187.21

(56) References Cited

U.S. PATENT DOCUMENTS

| | | | | |
|---|---|---|---|---|
| 2,833,624 A | * | 5/1958 | Sprauer | 423/478 |
| 3,864,456 A | * | 2/1975 | Winfield et al. | 423/478 |
| 4,176,168 A | * | 11/1979 | Goto | 423/478 |
| 4,473,540 A | * | 9/1984 | Fredette | 423/478 |
| 4,798,715 A | * | 1/1989 | Hardee et al. | 423/478 |
| 5,091,166 A | | 2/1992 | Engström et al. | 423/478 |
| 5,091,167 A | | 2/1992 | Engström et al. | 423/478 |
| 5,324,497 A | * | 6/1994 | Westerlund | 423/478 |
| 5,366,714 A | * | 11/1994 | Bigauskas | 423/478 |
| 5,380,517 A | | 1/1995 | Sokol | 423/478 |
| 5,433,938 A | * | 7/1995 | Wilson et al. | 423/477 |
| 6,171,485 B1 | * | 1/2001 | Kuke | 423/477 |

FOREIGN PATENT DOCUMENTS

| JP | 63-008203 | * 1/1988 | 423/478 |
|---|---|---|---|

OTHER PUBLICATIONS

Weast, R.C., "CRC Handbook of Chemistry and Physics", 52nd edition, p. D–105, 1971 (no month).*

W.J. Masschelein's basic textbook entitled: "Chlorine Dioxide. Chemistry and Environmental Impact of Oxychlorine Compounds", pp. 112 to 145. 1979 (no month).

* cited by examiner

Primary Examiner—Ngoc-Yen Nguyen
(74) Attorney, Agent, or Firm—Sim & McBurney

(57) ABSTRACT

A greater yield of chlorine dioxide from a chlorine dioxide generating process is obtained by providing acidic or acidity-generating components in the product chlorine dioxide solution to provide a chlorine dioxide solution having a pH below about 5.5.

8 Claims, No Drawings

METHOD OF IMPROVING YIELD OF CHLORINE DIOXIDE GENERATION PROCESSES

This application claims the benefit of the provisional application No. 60/179,412 filed on Feb. 1, 2000.

FIELD OF INVENTION

The present invention relates to a method of providing an improved yield in chlorine dioxide generation processes.

BACKGROUND TO THE INVENTION

Chlorine dioxide is a selective oxidizing agent widely used in pulp bleaching, water disinfection and numerous other applications. Due to its inherent instability, it cannot be transported and, therefore, it is produced in situ at the point of use.

Commercial methods for chlorine dioxide generation are based on two types of precursor chemicals, namely chloric acid/chlorates and chlorous acid/chlorites.

Large-scale generators typically used in pulp bleaching applications are based on the reduction of acidified chlorate ion solution to chlorine dioxide, according to the following general equation:

$$ClO_3^- + 2H^+ + e \rightarrow ClO_2 + H_2O \qquad (1)$$

where electrons are provided by means of either chemical reducing agents, such as chloride ion, methanol, hydrogen peroxide, sulfur dioxide, to name only a few, or via an electrochemical route (i.e. cathodic reduction).

For smaller scale applications (e.g. water treatment), the prevailing commercial method of chlorine dioxide generation involves a one-electron oxidation of chlorite ion:

$$ClO_2^- \rightarrow ClO_2 + e \qquad (2)$$

whereby the oxidant (electron acceptor) is, again, either chemical in nature (e.g. chlorine, hypochlorite, persulfate, chlorous acid) or electrochemical (anodic oxidation).

Chlorine dioxide generated by means of either chlorate reduction or chlorite oxidation, in most cases, has to be stripped from the reaction medium and reabsorbed in water to form a product solution of a desired strength, prior to being used. In some cases, in particular in certain water treatment applications, the entire process output, including not only chlorine dioxide, but also unreacted precursor chemicals and reaction byproducts, can be directly used in a given application, especially if the chlorine dioxide purity is not of primary concern and/or if the storage of product solution is not feasible for either technical or economical reasons. Generally, however, processes for chlorine dioxide generation typically include a unit operation related to the storage of the product solution.

A general review of industrial processes for synthesis of chlorine dioxide can be found, for example, in W. J. Masschelein's basic textbook entitled: "Chlorine Dioxide. Chemistry and Environmental Impact of Oxychlorine Compounds", pp. 112 to 145.

In the last several years, a trend has developed in both water treatment and pulp bleaching applications, towards a higher and higher purity of the chlorine dioxide produced. This tendency is primarily driven by the imposition of increasingly stringent environmental regulations related to the minimization of the content of certain types of chlorinated organic compounds, such as AOX (adsorbable chlorinated organics), THM's (trihalomethanes) and HAA's (haloacetic acids), believed to be formed due to the presence of chlorine contaminant in chlorine dioxide solution used in pulp bleaching and water treatment.

In view of the above, chlorine dioxide generation processes proceeding according to reaction (1) have evolved from those based on the use of chloride ion as a reducing agent, (known under the trademarks of R2®, R3®, R5® and SVP®), which necessarily result in a co-production of substantial quantities of chlorine, to those based primarily on the use of methanol (R8®, SVP-MeOH®, SVP-Lite®) and hydrogen peroxide (R11®, SVP-HP®), in which the co-production of chlorine is minimized.

In particular, the subatmospheric, single vessel hydrogen peroxide based process (SVP-HP®) believed to be described in U.S. Pat. Nos. 5,091,166 and 5,091,167 (both Engstrom at al) and the atmospheric, hydrogen peroxide based process, believed to be described in U.S. Pat. No. 5,380,517 (Sokol), were presented as being superior in terms of the chlorine dioxide purity; see e.g. the recitation in col.3, lines 21 to 24 of the '167 patent:

"However, with the present process it was possible to produce chlorine dioxide without any substantial addition of chloride ions, thereby obtaining an essentially chlorine-free process". (emphasis added)

We found, however, that the strength of the chlorine dioxide product solution originating from the processes of the kind described in the above-mentioned US patents, as well as certain other processes, resulting in the generation of highly pure chlorine dioxide, may significantly decrease over time leading to a substantial decrease in the yield of the overall process. The observed decrease of the product yield can be as low as a fraction of a percent and as high as about 10 to 20 percent. Typically, observed yield losses are in the range of about 0.5 to 5%.

This finding was very surprising since none of the cited prior art documents gave any indication that the high purity of the chlorine dioxide product solution can be detrimental to the overall process yield. The teaching of the prior art was clearly towards achieving the highest possible product purity, with particular emphasis on negligibly low chlorine content.

SUMMARY OF INVENTION

While the observed phenomenon is not easily explainable in the framework of current knowledge, it is believed that the presence of certain acidic or acidity-generating components in chlorine dioxide (wherein "acidic" refers to both Lewis and Bronsted type acids) may have a beneficial effect on the stability of the product solution, thus preventing the decrease of the overall process yield.

It has surprisingly been found that the presence of such acidic or acidity-generating components in the product chlorine dioxide solution to decrease the pH of the chlorine dioxide product solution to less than about 5.5, leads to an improved product stability and hence an overall improved yield.

Accordingly, in one aspect of the present invention, there is provided an aqueous solution of chlorine dioxide originating from a chlorine dioxide generating process, having a purity with respect to chlorine dioxide of at least about 95%, preferably at least about 98%, and acidified by the presence of at least one acidic or acidity-generating component to provide a pH of less than about 5.5. Such chlorine dioxide solution may have a concentration of about 4 to about 15 g/L, preferably about 5 to about 12 g/L, $ClO_2$.

GENERAL DESCRIPTION OF INVENTION

As noted above, the present invention involves adjusting the pH of an aqueous chlorine dioxide solution originating from a chlorine dioxide generating process to below about 5.5 to improve the stability of the product chlorine dioxide solution and hence the overall yield of chlorine dioxide from the chlorine dioxide generating process. The best results are obtained when the pH of the product chlorine dioxide solution is in the range of about 1.5 to about 5.5, preferably from about 2.0 to about 4.5, and most preferably from about 2.2 to about 3.9.

The acidic and acidity-generating components which are present in the chlorine dioxide product solution can be selected from a large group of both organic and inorganic Bronsted acids, their salts and acid anhydrides, such as, for example, hydrochloric acid, sulfuric acid, nitric acid, perchloric acid, chloric acid, chlorous acid, hypochlorous acid, phosphoric acid, boric acid, oxalic acid, formic acid, acetic acid, carbon dioxide, sulfur dioxide, to name only the most common.

Another group of acidic or acidity-generating components includes compounds, such as halogens, preferably chlorine. It was found that the acidic or acidity-generating components can be either reducers or oxidizers, which are not reactive with chlorine dioxide, but may be reactive with other reactants present in the overall system, such as hydrogen peroxide.

The presence of the acidic or acidity-generating components in the product solution can be a result of a direct addition of the components to the chlorine dioxide solution, for example, the addition of a small amount of hydrochloric acid to the chlorine dioxide product storage tank. Alternatively, the acidic or acidity-generating components can be a by product or an intermediate formed in the overall chlorine dioxide generating system, and then transferred to the product storage tank, together with chlorine dioxide. An example of the latter alternative is chlorine which can be co-generated with chlorine dioxide, preferably as a result of the addition of a small amount of chloride (typically not more than about 2 wt. % expressed as NaCl based on chlorate feed to the chlorine dioxide generator) to the reaction medium. The presence of a small amount of chlorine in the product solution does not constitute a detriment to the product purity, which still remains above the commercially acceptable level of about 99%, while at the same time, ensures that the pH of the product chlorine dioxide solution remains in the desirable range of about 1.5 to about 5.5.

The acidic or acidity-generating components can also be added to the water used for absorbing gaseous chlorine dioxide from the chlorine dioxide generator to form the product solution.

In certain cases, for example in the case of the hydrogen peroxide based chlorine dioxide generation processes, it is believed that the reaction of the acidic or acidity-generating component, such as chlorine with hydrogen peroxide, which, for various reasons, may be present in the product solution, results in the in situ formation of Bronsted acid in the product solution. This reaction is believed to proceed according to the following equation:

$$Cl_2 + H_2O_2 \rightarrow O_2 + 2HCl \qquad (3)$$

The resulting hydrochloric acid acts as a pH lowering agent and, at the same time, both chlorine and hydrogen peroxide are consumed, thus improving the product purity, with a simultaneous pH adjustment to the desired range.

It was found that the presence of hydrogen peroxide in the product chlorine dioxide solution is highly undesirable and should be avoided, especially at a pH above about 4.0. Reactions analogous to reaction (3) leading to simultaneous acidification and hydrogen peroxide removal from the product solution can also be carried out by means of other agents able to oxidize hydrogen peroxide to oxygen. Hydrogen peroxide can also be removed by reduction to water. Catalysts decomposing hydrogen peroxide, but not affecting chlorine dioxide, can also be employed.

EXAMPLE

The decomposition rate of a substantially pure chlorine dioxide solution having an initial $ClO_2$ concentration of 5 g/L was studied at ambient temperature as a function of pH. The results are tabulated below:

| # | pH | $ClO_2$ loss in [mg/L min] | $ClO_2$ loss per hour in [%] |
|---|----|----|----|
| 1 | 6.5 to 6.8 | 31.6 | 38 |
| 2 | 5.6 to 5.8 | 7.2 | 8.6 |
| 3 | 4.85 to 4.90 | 2.1 | 2.5 |
| 4 | 3.85 to 3.90 | 0.5 | 0.6 |

Upon spiking the $ClO_2$ solution having pH of about 6.5 with hydrogen peroxide, the decomposition rate of $ClO_2$ was greatly accelerated. The decomposition reaction, which followed the molar $ClO_2/H_2O_2$ stoichiometry of 2:1, was substantially completed in less than 2 minutes.

The above Example illustrates commercially unacceptable decomposition of $ClO_2$ solutions at pH values above about 5.5.

SUMMARY OF DISCLOSURE

In summary of this disclosure, the present invention describes a method of achieving a greater yield of chlorine dioxide from chlorine dioxide generating processes by providing acidic or acidity-generating components in the product chlorine dioxide solution, such that the resulting solution has a pH below about 5.5. Modifications are possible within the scope of the invention.

What we claim is:

1. An aqueous solution of chlorine dioxide originating from a chlorine dioxide generating process having a purity with respect to chlorine dioxide of at least about 95% and acidified by the presence of at least one acidic or acidity-generating component to provide a pH of about 2.2 to about 3.9, wherein the chlorine dioxide generating process is hydrogen-peroxide based and chlorine and hydrogen peroxide present in the chlorine dioxide solution in a product storage tank react to form hydrochloric acid, which is the acidic or acidic-forming component, and wherein the aqueous chlorine dioxide solution is rendered substantially free from hydrogen peroxide.

2. The aqueous solution of claim 1 wherein said purity is at least about 98%.

3. The aqueous solution of claim 1 having a chlorine dioxide concentration of from about 4 to about 15 g/L $ClO_2$.

4. The aqueous solution of claim 3 having a chlorine dioxide concentration of about 5 to about 12 g/L $ClO_2$.

5. The aqueous solution of claim 1 wherein said acidic or acidic-generating component is present in said aqueous chlorine dioxide solution as a by-product or an intermediate formed in a chlorine dioxide generation system and is transferred to a product storage tank together with the chlorine dioxide.

6. The aqueous solution of claim 5 wherein said by-product or intermediate is chlorine which is cogenerated with chlorine dioxide.

7. The aqueous solution of claim 6 wherein said chlorine is cogenerated with the chlorine dioxide by the addition of not more than about 2 wt % sodium chloride to the chlorine dioxide generating solution of the process.

8. The aqueous solution of claim 1 wherein hydrogen peroxide is removed from the aqueous chlorine dioxide solution by a oxidation.

* * * * *